Aug. 24, 1937.  W. SCHMITT  2,090,812
REGULATING APPARATUS
Filed Aug. 20, 1936
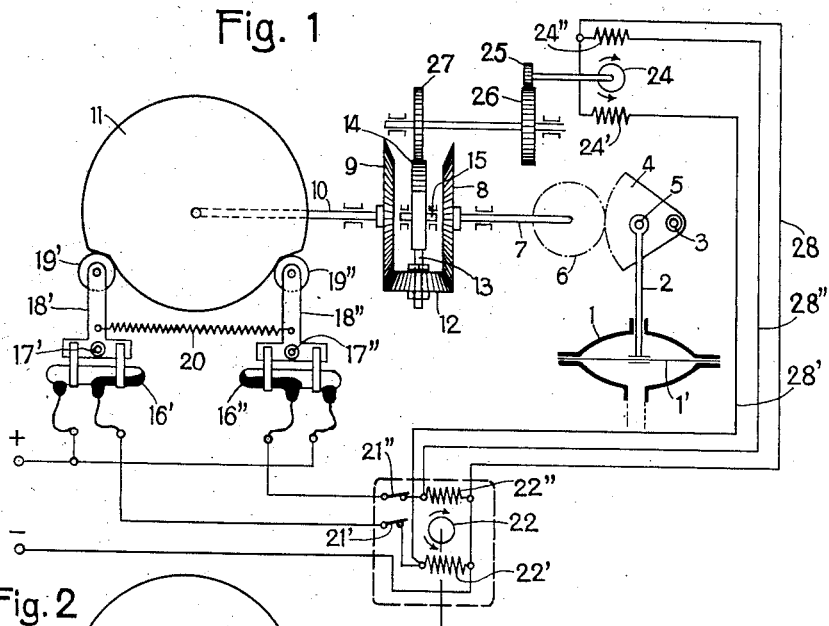
Fig. 1
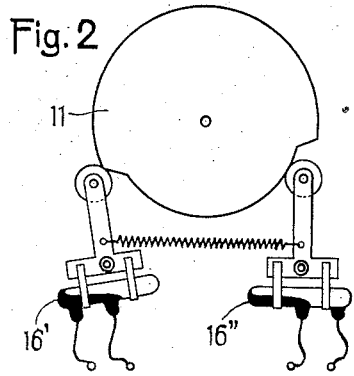
Fig. 2
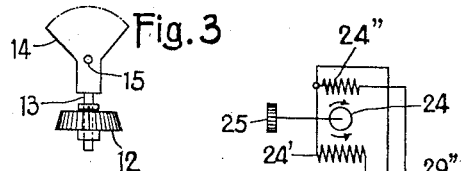
Fig. 3
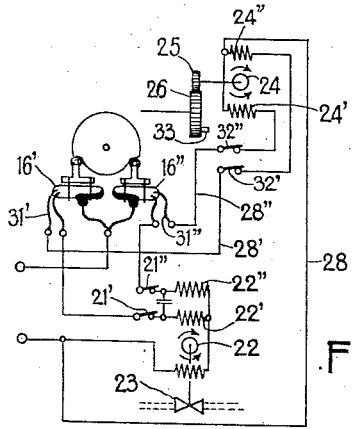
Fig. 5
Fig. 4
Inventor:
Werner Schmitt
By E. F. Wenderoth
Attorney.

Patented Aug. 24, 1937

2,090,812

UNITED STATES PATENT OFFICE 2,090,812

REGULATING APPARATUS

Werner Schmitt, Basel, Switzerland, assignor to Fabrikelektr. Apparate Fr. Sauter A. G., Basel, Switzerland Application August 20, 1936, Serial No. 97,059
In Switzerland August 26, 1935

5 Claims. (Cl. 137—78)

The invention relates to regulating apparatus of the known type for maintaining constant a temperature, a pressure, a degree of humidity or any other condition which is to be maintained constant, comprising a regulating member, such as valve or air ventilator vane the adjustment of which is automatically caused by a device responsive to the condition to be maintained through contact mechanism. Apparatus of this kind as hitherto constructed is open to the great disadvantage that at the moment when the responsive device arrests the adjustment of the setting of the regulating member the movement of this member has already advanced too far and consequently shortly afterwards a readjustment in the opposite direction takes place. In other words what may be termed over-regulation occurs and the regulating apparatus thus oscillates or hunts. This disadvantageous action always takes place when as a result of slack or cumulative action or large oscillations in operation a lag occurs between the movement of the responsive device and the operative conditions.

The present invention provides improved regulating apparatus of the kind above described in which the adjustment of the setting of the regulating member effected by the action of the responsive device is arranged to be arrested by a special device in such a manner that over-regulation is prevented.

In the accompanying drawing a constructional form of the invention is shown diagrammatically, Figure 1 being a view of the whole device in its normal or stationary position, Figure 2 being a view of a portion of the apparatus during the adjusting operation and Figure 3 a detail view of a portion of the apparatus; Figures 4 and 5 illustrate modifications of the apparatus of the preceding figures.

In Figure 1 of the drawing, 1 indicates a pressure regulator comprising a diaphragm 1' as the responsive device which is deflected to a greater or less extent in accordance with the pressure prevailing and which transmits its movement by means of a rod 2 to a toothed segment 4 rotatably mounted at 3, and to which the rod 2 is connected at 5.

A gear wheel 6 intermeshing with the toothed segment 4 is connected through a shaft 7 with the bevel wheel 8 of a sun-and-planet mechanism. The opposite bevel wheel 9 of this mechanism is connected to a cam disc 11 by means of a shaft 10. The two bevel wheels 8 and 9 are of equal diameter and intermesh with a bevel wheel 12, which is rotatably mounted on the shaft 13. The latter is attached to a toothed segment 14, mounted on a shaft 15. Figure 3 is a view in elevation of the segment 14 and the bevel wheel 12.

At the sides of the cam disc 11 are two mercury switch tubes 16', 16", which are secured to two inverse T-shaped levers 18', 18" rotatable about pivots 17', 17". The levers 18', 18" are provided at their upper ends with rollers 19', 19" which, under the action of a tension spring 20, are caused to engage with the edge of the cam disc 11.

The mercury switch tubes 16', 16" are connected through limit switches 21', 21" with the field windings 22', 22" of a small reversible electric motor 22, which drives a regulating valve 23.

The operation of the apparatus described is as follows:

Assuming that the pressure to be regulated falls, the diaphragm 1' is deflected downwards and by means of the toothed segment 4 rotates the gear wheel 6 in a clockwise direction together with the bevel wheel 8. This rotation is transmitted by means of the bevel wheel 12, the axis of which is still stationary, to the bevel wheel 9 and thereby revolves the cam disc 11 through a predetermined angle towards the left, as shown in Figure 2.

The mercury switch tube 16' switches on the motor current circuit from the positive terminal of the source through 16', 21', 22', so as to open the valve 23.

In order that the duration of the opening of the valve shall not be too great and to prevent over-regulation, simultaneously with the motor winding 22' the winding 24' of a small reversible auxiliary electric motor 24 is switched in, which, by means of the gear mechanism 25, 26, 27 acts upon the toothed segment 14 and rotates this in such a manner that the shaft 13 of the bevel wheel 12 (shown in Figure 1) is moved backwards. The bevel wheel 12 is thereby rotated (since the bevel wheel 8 is stationary) towards the left as viewed from below, and rotates the bevel wheel 9 together with the cam disc 11 in an anti-clockwise direction, so that the cam disc 11 is moved back from the operative setting of Figure 2 into the stationary setting of Figure 1. The driving motor 22 for the valve 23 as well as the auxiliary motor 24 are thereby switched off.

If a further fall of pressure occurs, the diaphragm 1' of the regulating member is again moved downwards and the same action again takes place.

In accordance with the extent of the decrease of pressure the diaphragm 1' is more or less deflected downwards, and the cam disc 11 is thereby rotated through a correspondingly larger or smaller angular movement so that the duration of the impulse of the regulating current is dependent upon the displacement of the responsive member.

It is generally necessary that the transmission ratio between the auxiliary motor 24 and the segment 14 should correspond to the conditions of operation of any particular case, for which purpose, for example, exchangeable intermediate gear wheels may be provided.

If, on the other hand, the pressure increases, the diaphragm 1' is deflected upwards and the actions described take place in a similar sequence. The cam disc 11 is rotated in a clockwise direction and the mercury switch tube 16'' effects the switching-in of the motorwinding 22'' so that the valve driving motor 22 is operated in the opposite direction.

At the same time the winding 24'' of the auxiliary motor 24 is switched in, and this motor is thereby also set into opposite rotation, so that the bevel wheels 12 and 9 also rotate in the reverse direction whereby the cam disc 11 is brought back into its stationary position.

The apparatus can, as already mentioned, also be used for regulating a temperature or degree of humidity or for maintaining constant any operating condition by the employment of a correspondingly arranged responsive device.

It is possible that under predetermined operating conditions the backward movement of the cam disc 11 to its stationary position may take place somewhat too early at times and consequently after a short interval a new regulating impulse may take place under the influence of the responsive device (1') if as a result of insufficient regulation, for example, a further decrease in pressure takes place. Such frequent correcting regulation can be overcome if the switching-in of the auxiliary motor 24 is slightly delayed as compared with the valve driving motor 22 so that the mercury switch tube 16' or 16'' remains at times somewhat longer in its switching-in condition.

This may, for example, be effected if instead of directly switching-in the auxiliary motor winding 24' or 24'' a relay having a delayed action is provided which only closes the current circuit of the auxiliary motor after a predetermined interval of time.

In Figure 4 a modification of this kind is diagrammatically shown. When, for instance, the mercury switch tube 16' switches in the motor winding 22' a delayed action relay 29' is energized through wires 28, 28' and after a short interval of time a switch 30' is closed, which then completes the current circuit for the winding 24', in accordance with which the auxiliary motor 24 carries out its reverse function, as above described. When the valve motor 22 is switched off the relay 29' also becomes deenergized and the switch 30' opens again. Similarly, a delayed action relay 29'' and a switch 30'' come into action when the mercury switch tube 16'' is operated.

Relays with delayed action are already known, the delayed action being effected by means of a braking mechanism, an air dashpot or similar known retarding means, the duration of the delay being arranged to be adjustable.

The delayed switching-in of the auxiliary motor 24, 24', 24'' can however be arranged to be otherwise effected as for instance by a delayed action switch controlled by the valve operating mechanism, said switch being interposed in the common line 28 and switched in shortly after the starting into operation of the valve driving motor 22.

In Figure 1 a valve operating mechanism is diagrammatically illustrated, which is driven by means of a reversible motor unit or by a direct current motor provided with two field windings for rotation in one or the other direction.

In the case in which the valve operating motor is a single phase alternating induction motor with condenser, the special connections are recommended according to Figure 5. The connection of the control wires 28', 28'' for the auxiliary motor 24 is effected at separate contacts 31', 31'' of the mercury switch tubes 16', 16'' which are connected to the windings 24', 24'' of the auxiliary motor 24 through two limit switches 32', 32'', which are switched off, for example, by means of a pin 33 on the wheel 26 in the limiting positions of this wheel so as to switch off the auxiliary motor in a similar manner to the operation of the limit switches 21', 21'' in Figure 1.

The modified apparatus of Figure 5 operates in exactly the same manner as that of Figure 1.

What I claim is:—

1. In apparatus for regulating the physical conditions obtaining in a space in which said conditions are required to be maintained substantially constant, the combination of means for varying said conditions, an electric motor for driving said means, a contact mechanism for controlling the direction of rotation of said electric motor, a device responsive to said conditions, a sun-and-planet mechanism operatively connected between said device and said contact mechanism and electrically operated auxiliary means operatively connected to said sun-and-planet mechanism for reversely operating said latter mechanism.

2. In apparatus for regulating the physical conditions obtaining in a space in which said conditions are required to be maintained substantially constant, the combination of means for varying said conditions, an electric motor for driving said means, a contact mechanism for controlling the direction of rotation of said electric motor, a device arranged to be displaced in one or other direction in accordance with variations in said conditions from a normal value, a bevel gear wheel operatively connected to said device, a bevel gear wheel operatively connected to said contact mechanism, a bevel gear wheel intermeshing with both of said gear wheels, a member on which said intermeshing gear wheel is rotatably mounted and which is itself rotatably mounted coaxially with said bevel gear wheels, and electrically operated auxiliary means for rotatably displacing said member.

3. In apparatus for regulating the physical conditions obtaining in a space in which said conditions are required to be maintained substantially constant, the combination of means for varying said conditions, an electric motor for driving said means, a contact mechanism for controlling the direction of rotation of said electric motor, a device arranged to be displaced in one or other direction in accordance with variations in said conditions from a normal value, a bevel gear wheel operatively connected to said device, a bevel gear wheel operatively connected to said contact mechanism, a bevel gear wheel intermeshing with both of said gear wheels, a member on which said intermeshing gear wheel is rotatably mounted and which is itself rotatably mounted coaxially with said bevel gear wheels, electrically operated auxiliary means for rotatably displacing said member and a delayed action relay mechanism controlling the operation of said auxiliary means.

4. In apparatus for regulating the physical conditions obtaining in a space in which said conditions are required to be maintained substantially constant, the combination of means for varying said conditions, an electric motor for driving said means, a contact mechanism for controlling the direction of rotation of said electric motor, comprising two mercury switch tubes, one for each direction of rotation of said electric motor, in combination with a common cam disc for alternately operating same, a device arranged to be displaced in one or other direction in accordance with variations in said conditions from a normal value, a bevel gear wheel operatively connected to said device, a bevel gear wheel operatively connected to the cam disc of said contact mechanism, a bevel gear wheel intermeshing with both of said gear wheels, a member on which said intermeshing gear wheel is rotatably mounted and which is itself rotatably mounted coaxially with said bevel gear wheels, electrically operated auxiliary means for rotatably displacing said member and a delayed action relay mechanism controlling the operation of said auxiliary means.

5. In apparatus for regulating the physical conditions obtaining in a space in which said conditions are required to be maintained substantially constant, the combination of means for varying said conditions, an electric motor for driving said means, a contact mechanism for controlling the direction of rotation of said electric motor, a diaphragm device responsive to said conditions, a sun-and-planet mechanism, operatively connected on one side to said contact mechanism, gear means operatively connecting said diaphragm device to the other side of said sun-and-planet mechanism, and electrically operated auxiliary means operatively connected to said sun-and-planet mechanism for reversely operating said latter mechanism.

WERNER SCHMITT.